May 26, 1953  I. LEVINE  2,639,869
FISHLINE HOLDER
Filed Sept. 20, 1947
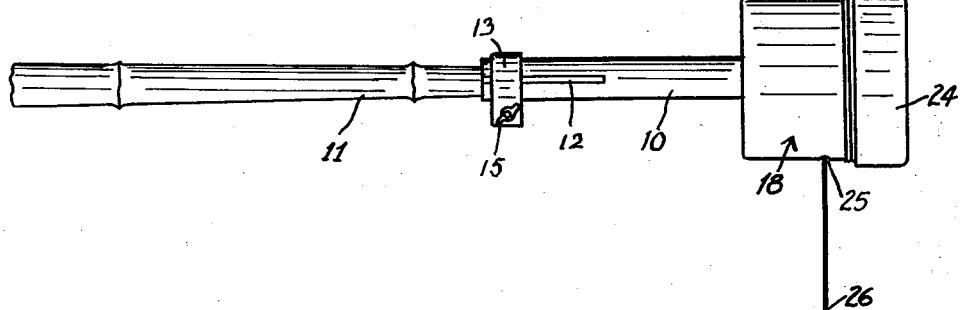
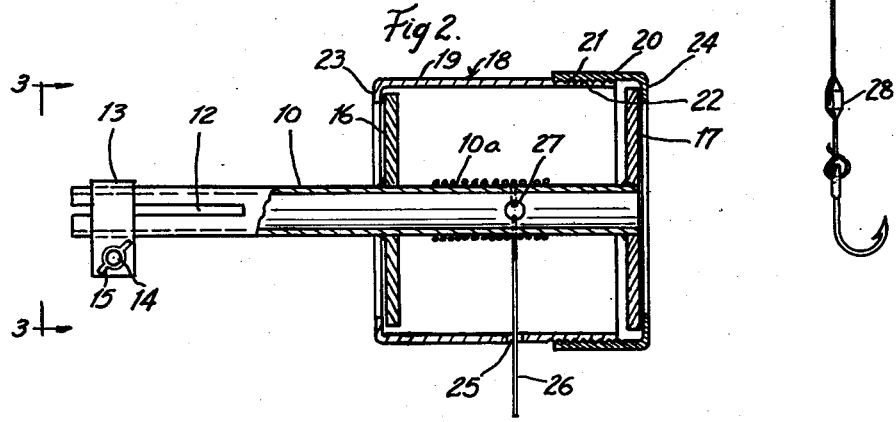
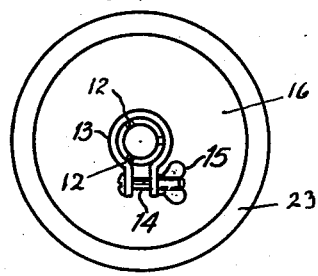
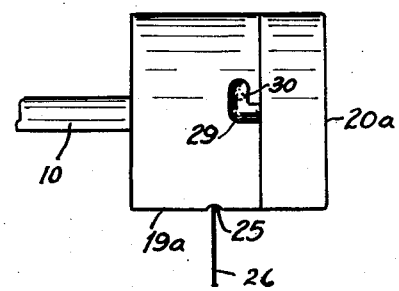
INVENTOR.
IRA LEVINE
BY
Sheridan Davis & Cargill Patented May 26, 1953

2,639,869

UNITED STATES PATENT OFFICE 2,639,869

FISHLINE HOLDER

Ira Levine, Chicago, Ill.

Application September 20, 1947, Serial No. 775,238

1 Claim. (Cl. 242—84.1)

This invention relates to improvements in fishline holders.

One object of the invention is to provide a simple lightweight device for holding fishline and which may be attached to the forward end of a fishing rod or pole and which enables the line to be taken in or paid out conveniently to provide an active or drop line of the length that may be required under given conditions. Often in fishing with a pole without a conventional reel, as from a boat or along a stream from shore, for example, a fisherman wishes to vary the length of his line due either to the depth of the water to the level to which he believes the fish may then be. Generally, a still fisherman, if using a pole without a conventional reel, has surplus line wound about the pole tip and when a longer active line is desired, he must untie the line at the pole tip or release a half hitch, or the like, and unwind the line or wind it up, as the case may be, for adjusting the active line to the desired length. A device made in accordance with the present invention may be detachably secured to the pole tip for carrying the surplus line and enables the active length or drop line to be taken in or paid out conveniently without tying or untying knots or half hitches in the line after each adjustment, and also prevents stripping the wound up line from the end of the pole.

An additional object of the invention is to provide a device which is adapted to carry a fishline in a reeled or wound up form and which device, with a line thereon, may quickly be attached to the tip of a fish pole and which when so attached enables the line to be paid out or taken in under varied conditions at the will of the user generally by merely rotating the pole on its horizontal axis in one direction or the other.

Other more specific objects and advantages of the invention will be apparent from the consideration of the following specification and accompanying drawings, wherein:

Figure 1 is a side elevation of an improved fishline holder which is illustrative of the present invention, the holder shown being attached to the tip of a fish pole which is illustrated fragmentarily;

Fig. 2 is an enlarged side elevation of the holder partly in longitudinal section;

Fig. 3 is an end elevation looking to the right of Fig. 2; and

Fig. 4 is a view of a modified form of the improved holder.

In the drawing, Figs. 1 to 3, the holder is shown as comprising a central axle 10, preferably of tubular form. Any suitable means may be employed for clamping the member 10 to the pole 11. In the illustrated embodiment of the invention, the tubular axle 10 is shown as being slotted at 12 and provided adjacent the rear end with an encircling clamp 13 provided with a small bolt 14 having a wing nut 15 thereon by means of which the slotted end of the tube 10 can be contracted and thus attached firmly to the fish pole. The tube or axle 10 is provided with two reel end members 16 and 17 of disc form, the end members being secured to the tube by solder, brazing or by any other suitable means. The tube and discs may, of course, be die cast in one piece, if desired. The reel ends 16 and 17 and the portion of the tube 10 indicated by numeral 10a which is disposed between the ends, constitute the reel or holder for retaining surplus line.

Surrounding the reel ends 16 and 17 is a sleeve indicated generally by the numeral 18 which is loosely mounted on the reel ends and is freely rotatable with respect thereto. The form of the sleeve shown in Figs. 1 to 3 comprises two cooperating sections 19 and 20 which are adapted by means of the threaded sections 21 and 22, to be assembled in position upon the reel. Section 19 is shown as being provided with an inturned flange 23 while section 20 is provided with a similar flange 24 which retain the sleeve normally in position upon the reel.

One of the sections, such as section 19, is provided with an aperture 25 through which the active or drop portion 26 of a line passes.

It will be seen that by rotating the reel, that is, the axle 10 and the reel ends 16 and 17, a line which has been attached to the portion 10a of the axle, as by extending one end through an opening 27 and tying it in position, may be wound upon portion 10a. In so winding a line upon the portion 10a, the sleeve 18 is held against rotation. By rotating the member 10 in the opposite direction, the line may be unwound from the reel for elongating the drop line section 26.

In placing the line initially upon the reel, the sleeve may be removed and the entire line wound upon the reel after anchoring the inner end of the line to the portion 10a. Section 19 of the sleeve is placed in position first and the free end or drop section of the line is threaded through the opening 25 whereupon section 20 of the sleeve can be placed in the position shown in Fig. 2.

When the line holder is attached to the tip of a fish pole, the line may be paid out by rotating the pole in the proper direction assuming that there is sufficient weight on the line, as in the form of a sinker 28, to restrain the sleeve from rotating with the reel. If there is insufficient weight or tension of the drop portion of the line, it is necessary to hold the sleeve 18 against rotation while the pole and thus the reel portion of the holder are rotated in the proper direction. Thus where a substantial amount of line is out, the weight thereof enables more to be let out or some to be taken in by a mere rotation of the pole in the proper direction, the sleeve being, as stated, relatively rotatable and being restrained from rotation by the drop portion of the line while the pole is rotated.

In case a fisherman, using an improved line holder, gets a snag or has his hook caught on some under-water object, he can, by rotating his pole in the proper direction, wind the line up on the holder until the tip of the pole is close to the hook thereby facilitating the release of the hook or if that is not possible, to break the line close to the hook thereby avoiding loss of a substantial portion of the line which might otherwise occur. Likewise, when a fish has been hooked and is being played by the fisherman, he can, if desired, by rotating the pole take in a portion of his line, thus shortening it and enabling him, by use of the pole alone and without grasping the line to play the fish closer to his boat or to shore preparatory to netting or otherwise landing it.

The improvements not only provide means for readily attaching a fishline to the tip of a fish pole but permit the line to be paid out or taken in conveniently, often while the pole is extended over the water.

In Figure 4, the holder is of the same form as that described above except that the overlapping portions of the two sleeve sections are unthreaded and in lieu of cooperating threads a bayonet type groove 29 is shown pressed outwardly in section 19a while an outwardly pressed locking lug 30 is provided in section 20a which cooperates with the bayonet groove in releasably latching the two sleeve sections together. If desired, the line holder may be formed with a one piece sleeve or with two sections permanently fastened together after a line has been attached to the reel and wound thereon with the free end 26 extended through the aperture 25. In such instance, the holder and line will be sold as a unit.

While I have shown and described structures that are illustrative of my improvements, I do not wish to be restricted specifically thereto.

I claim:

A fishline holder comprising a pair of discs and an axial member upon which the discs are secured in spaced apart relation, said axial member comprising a laterally extending slotted tubular portion into which the tip of a fish pole is adapted to be inserted, means for clamping said slotted portion of the axial member to the pole tip and a rotatable sleeve spanning the outer peripheries of said discs and being rotatable thereon and provided with an aperture through which is adapted to extend the active portion of a fishline wound upon the axial member between the discs.

IRA LEVINE.

References Cited in the file of this patent

UNITED STATES PATENTS

| Number | Name | Date |
|---|---|---|
| 1,377,787 | Park | May 10, 1921 |
| 2,261,629 | Murphy | Nov. 4, 1941 |
| 2,417,587 | Damstra | Mar. 18, 1947 |
| 2,456,115 | Duhaime et al. | Dec. 14, 1948 |